Jan. 7, 1936.          R. SUCZEK          2,027,070
AUTOMATIC CLUTCH CONTROLLING MECHANISM
Filed Oct. 27, 1932          2 Sheets-Sheet 1
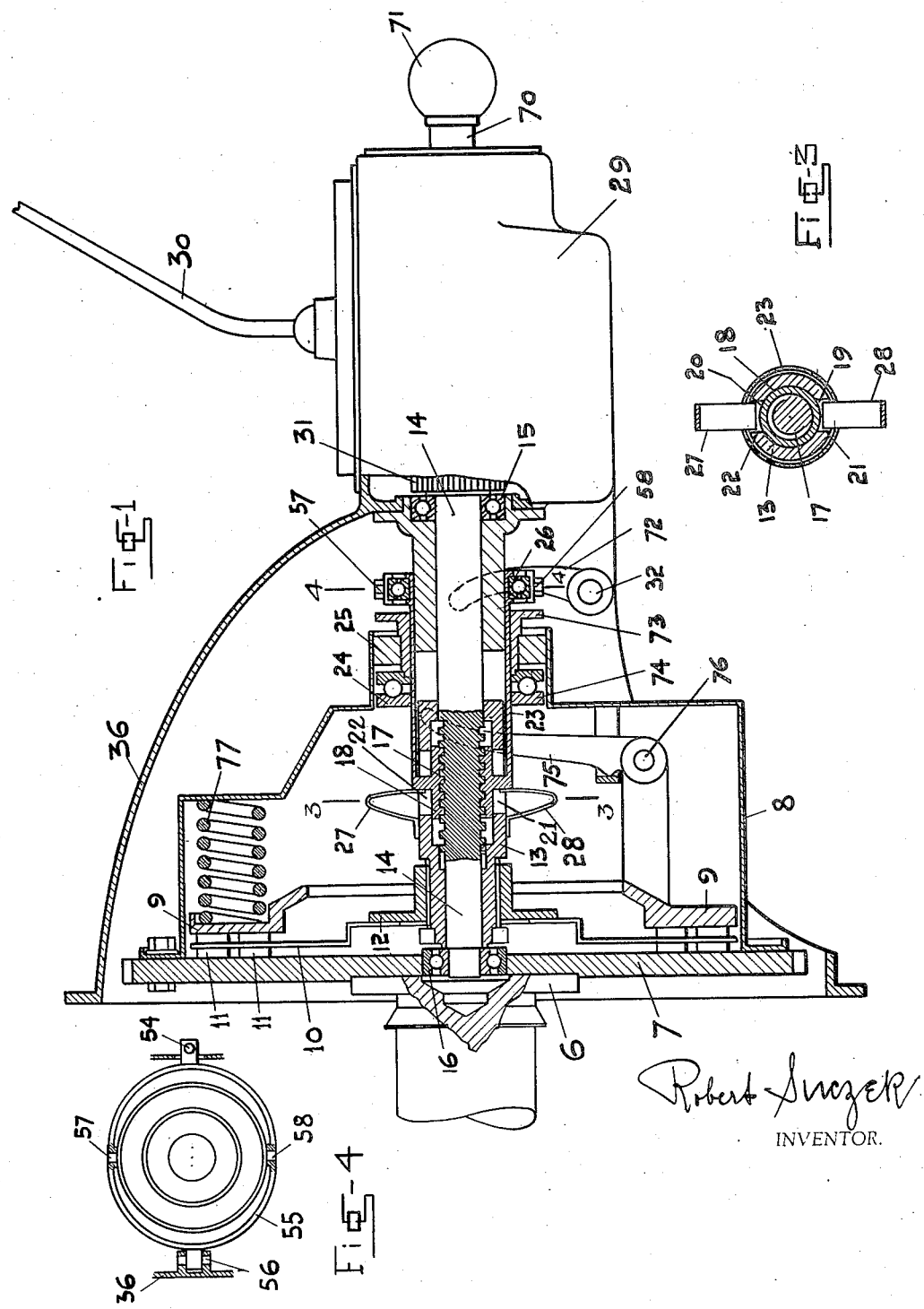
Robert Suczek
INVENTOR.

Jan. 7, 1936.     R. SUCZEK     2,027,070
AUTOMATIC CLUTCH CONTROLLING MECHANISM
Filed Oct. 27, 1932     2 Sheets-Sheet 1
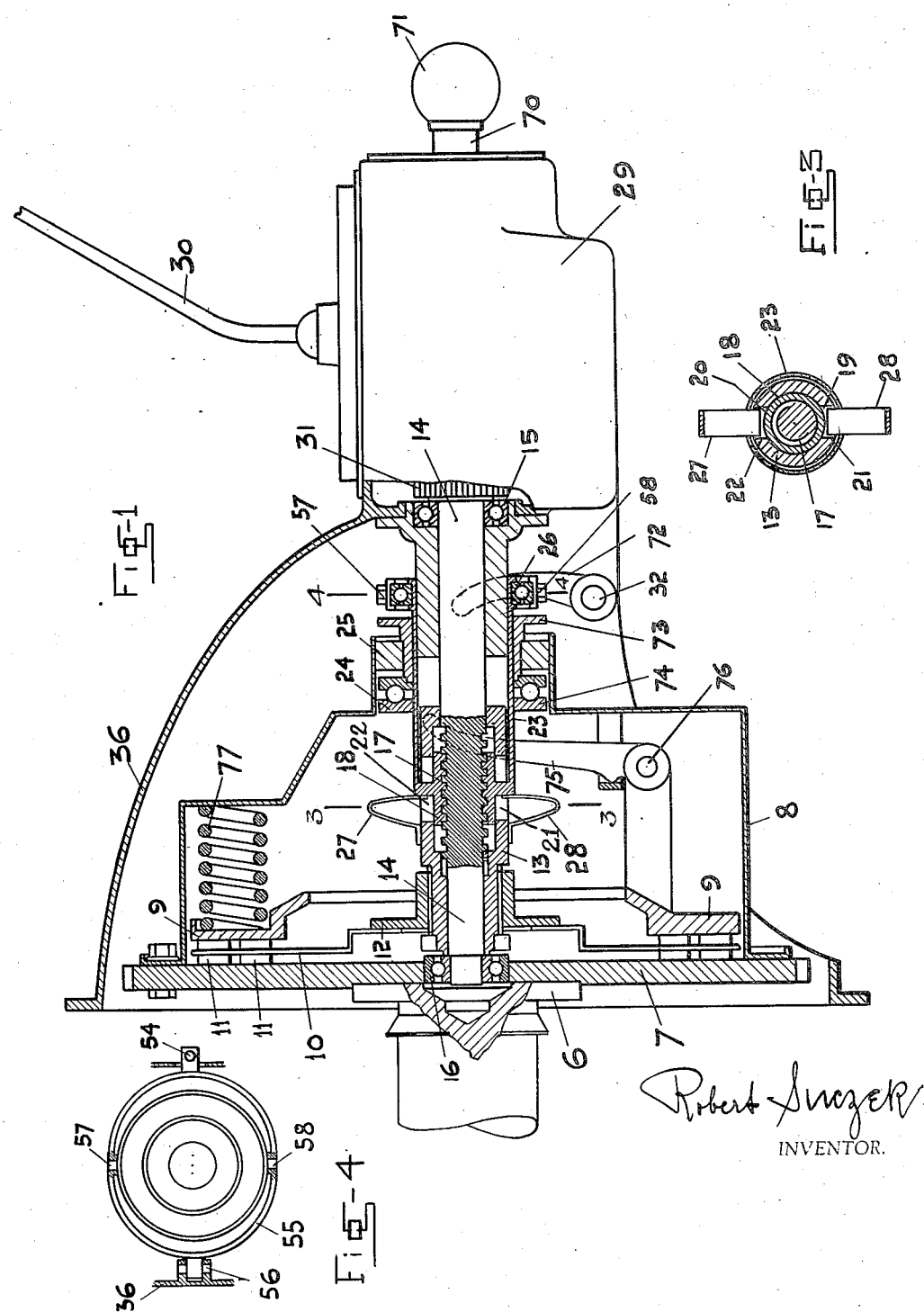
Robert Suczek
INVENTOR.

Patented Jan. 7, 1936

2,027,070

UNITED STATES PATENT OFFICE 2,027,070

AUTOMATIC CLUTCH CONTROLLING MECHANISM

Robert Suczek, Detroit, Mich.

Application October 27, 1932, Serial No. 639,785

12 Claims. (Cl. 192—32)

My invention pertains to any disengageable clutch with variable load and particularly to such clutches as used in motor vehicles operated with internal combustion engines.

One of the main objects of the present invention is to create an automobile clutch which will automatically declutch the engine from the transmission or the driving wheels at any time when the engine stops driving the car and the car begins to drive the engine. There are devices of different design and based on several different principles which automatically release the clutch in coordination with the operation of the accelerator pedal. Most of these clutches are released only when the accelerator pedal is released, and for the so-called "free wheeling" a second independent mechanism is required.

My present invention has therefore also for its object to render the separate free wheeling device unnecessary and to make the operation of the clutch control independent of the accelerator.

Thus, no matter what the engine speed or load is, the clutch is not under the direct influence of the engine, but only under the influence of the torque transmitted through the clutch, particularly depending upon the direction and changes of direction of the torque, from positive to negative.

Another purpose of my invention is to render the control of power transmission independent of the speed, and to perform the shifting and declutching by the kinetic energy of the moving car and not by the engine or the vacuum produced by the engine in the manifold. Further advantages of my present invention are, compactness, cheapness, a full range of operation at all speeds and elimination of piping and vacuum cylinders.

My invention resides in the application of a spring in combination with a screw and nut through which the power from the engine is transmitted to the car and utilizing the relative motion of screw and nut corresponding to changes in the direction of torque transmission for influencing and controlling the power transmission from the engine to the car.

With these and other advantages and objects of my invention in view, together with means whereby the same may be carried out, my invention consists in the arrangement, construction and combination of various parts of my new device and method of its operation as described in the specification, claimed in the claims and illustrated in the accompanying drawings.

It will be understood, that some of the particular constructions and arrangements described and shown, have been shown for illustrative purposes only, and that the invention as defined by the claims hereto appended may be otherwise embodied without departure from the spirit and scope of the invention.

Fig. 1 is a longitudinal section through an automobile clutch embodying a part of my invention.

Fig. 2 is an outside view of Fig. 1 showing the arrangement of the foot pedal and other levers for automatic operation of the device.

Fig. 3 is a cross section through a part of Fig. 1 along line 3—3 through the screw and nut which are responsive to torque direction changes.

Fig. 4 is a cross section and view of a part of Fig. 1 along line 4—4.

Fig. 5 is a side view of a part of Fig. 2.

In Fig. 1 the end of the engine shaft 6 is connected by a flange in driving relation to the disc or fly wheel 7. Shell 8 represents the clutch housing and 9 the pressure plate. The clutch plate 10 carrying friction material 11—11 is located as usual between the pressure plate and the fly wheel and is mounted on a hub 12 slidably splined and in driving relation on hollow shaft 13; this shaft is carried by the screw shaft 14 which in turn is suspended by the two ball bearings 15 and 16. Shaft 14 is equipped with thread 17 of suitable pitch and is in operative relation with nut 18 which has two wings 19 and 20 fitted into slots 21—22 of the hollow shaft 13 (see also Fig. 3).

The two wings 19 and 20 are in rigid connection with a bushing 23 extending through bearing 24 and gland 25 to the outside and carrying in a groove the ball bearing 26. The wings 19 and 20 are slidably fitted in the slots 21 and 22 but nut 18 revolves in unison with the hollow shaft 13.

It may be understood that any power transmitted from the engine to the car or from the car to the engine must necessarily go through the nut 18. Springs 27 and 28 are attached to the hollow shaft 13 and prevent a too sudden and shockwise transmission of power from the engine to the car when the clutch is engaged.

29 is a transmission gear housing, 30 the gear shift lever as on any conventional car and 31 a gear on the shaft 14 through which at certain occasions when driving the car in second or low gear power is transmitted from the engine to the car.

32 is the clutch pedal shaft (Fig. 2) which may be operated either by the foot pedal 33 or automatically by the spring 34 or spring 85. One end of spring 34 is attached to a fixed point 35 on the casing 36 and the other end is attached to a loop 37 sliding on bolt 38 carried by the foot pedal 33.

The loop 37 is jointed to a rod 39 sliding in guide 42 and carrying a lug 40 which may at times engage a lever 41 fulcrumed at 43 (Fig. 5) to the casing 36 and loaded by spring 44 tending to press the lever 41 into engagement with lug 40. A bell crank lever fulcrumed at 45 presses with arm 46 on the lever 41, while the other arm 47 is acted upon by the head 48 of rod 49 and is loaded by spring 50 downward.

A cable or the like 51 is attached at point 52 to the loop 37, leads over a pulley 53 and is attached with its other end to point 54 (Fig. 4) of the lever 55. This lever is fulcrumed at 56 to casing 36 and is actuated by roller bearing 26 at the points 57 and 58.

Arm 46 of the bell crank lever engages in its upward motion the retaining lever 41 by a nose 59. Rod 49 is slidably supported by guide 60 and spring 61 acts against a ring 62 and tends to push rod 49 upwardly. Spring 50 keeps the bell crank lever always in its lowest possible position. At its top the rod 49 is surrounded by a tubular member 63 with a mushroom head 64, serving as the accelerator of the engine. A throttle rod 65 is actuated by this tubular member through a suitable spring loaded linkage 66 and 67 of any desirable or conventional design.

The tubular member or accelerator 63 may be guided in another tube 68 attached to the floor board 69.

70 is the shaft protruding from the gear box 29 to which is connected the conventional universal joint 71 driving the rear wheels of the car. To lever 33 is also pivotally attached at 80 a rod 81 carrying an enlargement 82. This rod slides in a tubular member or loop 83 hinged to one end of spring 85, the other end of such spring being attached to the gear housing 29. Lever arm 88 is equipped at its end with a hook able to engage and retain the tubular member 83 to keep the spring loaded if so desired and to release the spring force at the right moment. The arm 88 is fulcrumed at 89 and its other end 90 is located under the ring 62 which is attached to and travels with rod 49.

An arm 86 attached to and traveling with the tubular member 83 is brought temporarily into engagement with a traveling retainer 87 moving with and attached to the cable 51. The position of the retainer relative to the arm 86 is such that it will load the spring through the arm 86 when point 54 of lever 55 moves to the left.

At 91 on lever arm 47 is attached a rod or another cable 92 connected to and actuated by the point 54 of lever 55.

The operation is as follows:

Supposing that the clutch is in engagement and the engine driving the car. Clutch plate 10 with hub 12 is driving the hollow shaft 13, since the pressure plate 9 is pressed against the friction material 11. The hollow shaft transmits torque from the engine to the car through wings 19 and 20 of the nut 18. The springs 27 and 28 are compressed by the nut to such a degree that the torque is transmitted through the thread 17 to shafts 14 and 70. This condition prevails as long as the car is driven by the engine, as for instance, when accelerating, or negotiating a hill or driving at a constant speed on level road, etc.

If however for some reason the engine begins to act as a brake and is driven by the momentum of the car, then the threaded spindle 14 becomes the driving member and the thread acts on the nut tending to move it to the right.

The axial motions of the nut, which are solely due to changes in direction of torque, are transmitted to the ball bearing 26 and lever 55 by the tubular member 23, and also to the cable 51 and cable or rod 92.

During the movement of the nut to the left (positive torque change) the cable loads the springs 34 and 85. As soon as the springs attain a position indicated in Fig. 2, retainer 41 and hook lever 88 engage their respective members and the springs are locked and must remain loaded until such time when they become unlocked again. This unlocking is accomplished by and depends entirely upon the position of the rod 49. In its upper position rod 49 unlocks spring 34 and the clutch is disengaged, and in its lower position the rod 49 causes spring 85 to be unlocked and to engage the clutch again for power transmission.

During any period while the nut 18 is under positive torque action (transmission from the engine to the car) the bearing 26 will be in its extreme position to the left and the cable 51 will be taut. During a period of negative torque (the car driving the engine) the cable will be slack.

If at the beginning of the negative torque period clutch rod 49 is in its highest position the abutment 48 releases the relay comprising lever 46, and spring 34 moves the foot pedal 33 to the left and disengages the clutch. Spring 85 remains loaded until the clutch rod 49 is depressed. The arrangement of the clutch rod relative to the accelerator pedal 64 may be anything desirable or suitable. The rod 49 may be inside of the accelerator pedal, as indicated in the drawings.

While the operation of the clutch through the springs 34 and 85 is automatic, the driver is able to declutch any time manually by the foot pedal 33.

This pedal 33 and arm 72 are keyed to cross shaft 32. By depressing the foot pedal 33, the arm 72 presses against bushing 73, which moves the ball bearing 74 to the left and moves the pressure plate 9 away from member 7, through arm 75, thus disengaging the clutch.

When starting up the engine without the intention of moving the car immediately thereafter, the driver will not depress the clutch rod 49, but only the accelerator until ready to move the car. Once the car is in motion the driver holds his foot on both the accelerator and the clutch rod. If the car is stopped for parking, the spring 34 will disengage the clutch as soon as the foot is removed and it will remain disengaged even if the engine is stopped.

When starting up from such condition the driver may first place the car into low gear then start the motor either by the foot accelerator or by the hand throttle and thereafter depress the clutch rod for engaging the clutch and moving the car. Or the driver may start the motor first, then place the car into low gear and engage the clutch by depressing the clutch rod 49.

If it is desired to let this device work as a free wheeling equipment a cable 92 is placed from point 54 of lever 55 to point 91 of lever 47. This arrangement will cause the arm 46 to trip the relay or move lever 41 upwardly and release spring 34, disengaging the clutch every time the torque transmitted through nut 18 becomes negative and the nut moves with point 54 towards the right.

If after such a free wheeling period the driver wishes to engage the clutch all he has to do is to depress the clutch rod 49. Whether the engine is accelerated or not at the same time is immaterial, for the clutch position depends entirely on the driver whether he depresses the accelerator at the same time or later.

It will be understood that the principle of this automatic clutch operating device is to use power from the clutch while in engagement with the engine, to load the two springs 34 and 85, and to store the load until such time, when it is required for action, either to engage or to disengage the clutch.

Spring 34 has a load rating, great enough to overcome the forces of springs 77 of the clutch when disengaging the clutch, while spring 85, because acting in the same direction as the springs 77, must have only a sufficient rating to overcome the difference of the force of 34 minus the force of springs 77 reduced to a common point on lever 33.

If the total force of the clutch springs 77 be "A", the force of spring 34 "B", and the force of spring 85 be "C", (all reduced to a common point of action on lever 33) then the following relation between these three spring forces must exist:

A smaller than B,
B—A smaller than C.

It may be understood that under ordinary driving conditions the accelerator button and the rod 49 are depressed and the head 48 is not touching the lever arm 47. Arm 46 retains loop 37 in its extreme right hand position and spring 34 is under tension.

If the clutch rod 49 is released (with or without the accelerator), the spring 61 pushes it up and the head 48 releases the spring for action, loop 37 moves foot pedal 33 to the left and the clutch is released. The engine may now be raised to any speed and the clutch will remain released until the driver depresses clutch rod 49. Through this depression the hook 88 releases spring 85, which moves the foot pedal 33 to the right and engages the clutch. The car may be placed into motion again and as soon as the engine develops a positive torque the springs are placed under tension again, locked by the respective relays where they remain until changes in the clutch rod position or the reversed torque release the relays.

What I claim is:

1. An automatic clutch control for automobiles comprising two springs for storing up energy, a relay with each spring and means for operating one of said relays for disengaging the clutch by the corresponding spring and the other relay for engaging the clutch by the other spring.

2. An automatic clutch control for automobiles comprising two springs for storing up energy while transmitting power from the engine to the car, a relay with each spring, means operable by the driver of the car or with changes in the power output for releasing the stored energy from one spring to engage the clutch and from the other spring for disengaging such clutch.

3. An automatic clutch control for automobiles comprising a disengageable clutch between engine and transmission, means between the clutch and the transmission responsive to torque reversals for diverting energy from the engine for operating the clutch and means for controlling the release of such energy either manually or automatically by torque reversals or both.

4. In an automobile having a clutch for transmitting power from the engine to the car wheels, a shaft with a foot pedal mounted thereon for manually releasing the clutch, a spring acting through a loop on the foot pedal, means for loading the spring by engine power through the loop, means for holding the spring in loaded position, and means for releasing the spring load for engaging or disengaging the clutch, said releasing means being operable either automatically by torque reversals in the power transmission or manually by the operator's foot.

5. An automobile clutch operable by a spring, means rotated by the engine and connected to the spring by a member for loading the spring while the engine is clutched to the car, releasable means for storing the power in the spring and automatically releasing the stored power for operating the clutch by the engine rotated means in response to torque reversals.

6. A power transmission comprising a disengageable clutch through which power from a power shaft may be transmitted to a load shaft, a spring, means comprising a screw to load the spring by the power from the power shaft, means to store such load in the spring and means to release such load for disengaging the clutch through the spring force.

7. An automatic clutch control for automobiles comprising a spring for storing energy, means to operate the clutch by releasing such spring energy, and means controlling the first named means by foot and in response to torque reversals transmitted through the clutch and through a screw.

8. An automatic clutch control for automobiles comprising a disengageable clutch between engine and transmission, means transmitting power from the clutch to the transmission and responsive to torque reversals, means for storing energy from the engine to operate the clutch, and means for controlling the release of such energy by foot, and automatically by said torque reversals.

9. An automatic clutch control for automobiles, comprising a disengageable clutch between engine and transmission, means transmitting power from the clutch to the transmission or vice versa, said means being responsive to torque reversals, means to direct energy from first named means to two springs, means to store such energy in said springs and means to release such energy for clutch operations by foot, and automatically by the torque reversals.

10. A power transmission comprising a power shaft and a load shaft, means to couple said power shaft to the load shaft, two springs, means to load the springs by energy from the power shaft and means to release the energy of the springs to engage the coupling means by one of said springs and to disengage the coupling means by the other spring.

11. A motor vehicle friction clutch for power transmission from the engine to the driving wheels of the vehicle, a plurality of springs for creating sufficient friction within the clutch to transmit the power developed by the motor, a releasing spring, means to overcome the friction producing force of the plurality of springs when releasing the clutch through the force of the releasing spring and another spring for engaging the clutch for power transmission in opposition to the releasing spring.

12. A power transmission comprising a power shaft and a load shaft, and a disengageable clutch for transmitting power from the power shaft to the load shaft, an intermediate shaft rotating with a nut whose thread engages a co-operating thread on the load shaft, a spring, means causing the nut to travel axially relative to the intermediate and to the load shaft with reversals of the torque transmitted, means for storing energy in the spring, and means for releasing the stored energy to clutch and declutch the power transmission, said releasing means being responsive to foot action and to said torque reversals.

ROBERT SUCZEK.